United States Patent [19]

Yasuda et al.

[11] Patent Number: 5,038,459

[45] Date of Patent: Aug. 13, 1991

[54] METHOD OF FABRICATING THE DIAPHRAGM UNIT OF A CONDENSER MICROPHONE BY ELECTRON BEAM WELDING

[75] Inventors: Mamoru Yasuda; Hitoshi Toda, both of Kobe, Japan

[73] Assignee: Hosiden Electronics Co., Ltd., Osaka, Japan

[21] Appl. No.: 477,362

[22] Filed: Jan. 16, 1990

Related U.S. Application Data

[62] Division of Ser. No. 320,333, Oct. 19, 1988.

[30] Foreign Application Priority Data

Mar. 4, 1987 [JP] Japan ................................ 62-51018
Jul. 22, 1987 [JP] Japan ................................ 62-11322

[51] Int. Cl.[5] ................................ H01G 5/16

[52] U.S. Cl. ................................ 29/594; 29/25.41; 29/446; 228/112; 381/168; 381/174

[58] Field of Search ................................ 29/594, 25.41, 446; 381/168, 174; 228/112

[56] References Cited

U.S. PATENT DOCUMENTS 2,106,813 2/1938 Romanow ................................ 381/168
4,648,480 3/1987 Watanabe et al. ................................ 381/174 X

FOREIGN PATENT DOCUMENTS 51-10924 1/1976 Japan ................................ 29/594

*Primary Examiner*—Carl E. Hall
*Attorney, Agent, or Firm*—Pollock, VandeSande and Priddy

[57] ABSTRACT

A one-piece diaphragm unit for a condenser microphone fabricated by gripping a diaphragm with predetermined tension, between metallic first and second rings, and electron beam welding the two rings and diaphragm together. Preferably, one of the first and second rings is provided with an edge flange which is raised about its inner periphery and extends inwardly of the other ring, biasing thereinto the diaphragm. When the diaphragm unit is built in the condenser microphone, a support plate of an insulating material is disposed in engagement with the first ring.

2 Claims, 10 Drawing Sheets

METHOD OF FABRICATING THE DIAPHRAGM UNIT OF A CONDENSER MICROPHONE BY ELECTRON BEAM WELDING

TECHNICAL FIELD

The present invention relates to a condenser microphone and, more particularly, to a diaphragm unit for use therein and a method of making the same.

BACKGROUND ART

FIG. 1 shows a conventional condenser microphone. A cylindrical housing 11 opens at both ends has a flange 12 formed integrally therewith and extending inwardly from its front marginal edge. Diaphragm retaining rings 13 and 14 are urged and held against the flange 12 on the inside thereof. The peripheral portion of a diaphragm 15 is clamped between the diaphragm retaining rings 13 and 14. A cylindrical presser 16 is pressed forwardly against the back of the diaphragm 15. The inner surface of the housing 11 has cut therein screw threads 17, with which a ring-shaped screw 18 is threadably engaged to fix the diaphragm retaining rings 13 and 14 while pressing them forwardly. Further, ring-shaped screws 19 and 21 are threadably engaged with the screw threads 17, by which the cylindrical presser 16 is urged against the diaphragm 15, applying thereto a desired tensile force.

A back electrode 22 is disposed just behind the diaphragm 15 in opposing relation thereto and supported at the rear by a ring-shaped support plate 23 of an insulating material, which is in turn held by the ring-shaped screw 21 threadably engaged with the screw threads 17. A spacer 20 is interposed between the cylindrical presser 16 and the support plate 23, defining the space between the diaphragm 15 and the back electrode 22. A ring-shaped screw 24 is threadably engaged with the screw threads 17 behind the ring-shaped screw 21. The back electrode 22 has a terminal 25. The housing 11 is covered all over its front open end with a grid 26. The back electrode 22 is deposited with an electret film 27 opposite the diaphragm 15.

The diaphragm 15 of the conventional condenser microphone is pressed by the cylindrical presser 16 and is held taut with a predetermined tensile force. Since the condenser microphone has incorporated therein the cylindrical presser, it is inevitably bulky, calls for many assembling steps, and hence is cumbersome to assemble and expensive. Moreover, the diaphragm 15 is held taut by the cylindrical presser 16, which is retained by the ring-shaped screw 19 in the housing 11; so that the tension of the diaphragm 15 is liable to vary with a change in ambient temperature unless the diaphragm retaining rings 13 and 14, the ring-shaped screw 18, the cylindrical presser 16 and the ring-shaped screw 19 are made of the same material. Besides, there is a fear that a change in the tension of the diaphragm 15 results from a -possible change in the pressure applied thereto by the cylindrical presser 16 although the latter is fixed by the two screws 19 and 21.

Furthermore, in the microphone shown in FIG. 1 the diaphragm 15 and the back electrode 22 must be spaced a predetermined distance apart with high -precision. To meet this requirement, the cylindrical presser 16 and the back electrode 22 are finished to the same height (the length in the direction parallel to the axes thereof) through precision polishing, and then the space between the diaphragm 15 and the back electrode 22 is defined by the thickness of the spacer 20. In this instance, high precision is needed in machining the cylindrical presser 16 and the back electrode 22, and the spacer 20 is needed, which leads to an increase in the number of parts used. These factors inevitably raise the cost of the microphone.

An object of the present invention is to -provide a simple-structured diaphragm unit which has a diaphragm held with required tension by itself and a method of making such a diaphragm unit.

Another object of the present invention is to provide a diaphragm unit designed so that the tension of the diaphragm is essentially insusceptible to the influence of temperature in the microphone housing.

Another object of the present invention is to provide a simple-structured condenser microphone having a diaphragm unit built therein.

Yet another object of the present invention is to provide a simple-structured condenser microphone which permits easy adjustment of the condenser gap.

DISCLOSURE OF THE INVENTION

According to an aspect of the present invention, the diaphragm unit includes a first ring, a second ring and a diaphragm held with a predetermined tensile force and having its peripheral portion gripped between the first and second rings. On account of such a structure, the diaphragm unit of the present invention dispenses with the cylindrical presser for applying tension to the diaphragm, and hence permits the fabrication of a condenser microphone which is small in the number of parts therefor and small in size accordingly. Especially, the first ring can be used also as the microphone housing, in which case the microphone can be further miniaturized. Moreover, when machinable crystalline glass is employed as the material of the back electrode support plate, screw threads can be cut in the peripheral surface of the plate, so that it is -possible to obtain a microphone which allows ease in adjusting the condenser gap.

According to another aspect of the present invention, the diaphragm is mounted on a jig and attached thereto at its marginal portion; the first ring is urged, by a presser engaged with the jig, against the diaphragm to apply tension thereto; the second ring is mounted on the first ring with the diaphragm gripped therebetween; and the first and second rings and the diaphragm are welded together by electron beam welding. In this way, a diaphragm unit is obtained in which the diaphragm is sandwiched between the first and second rings and held with predetermined tension by itself.

According to yet another aspect of the present invention, the diaphragm is held at its marginal portion between the first and second rings and coupled thereto through electron beam welding and then the first and second rings are expanded to apply tension to the diaphragm. Also in this case, the diaphragm of the diaphragm unit is held with predetermined tension by itself. Accordingly, no cylindrical presser is needed in the case where the diaphragm unit is in the condenser microphone.

BEST MODE FOR CARRYING OUT THE INVENTION

Figure 1:
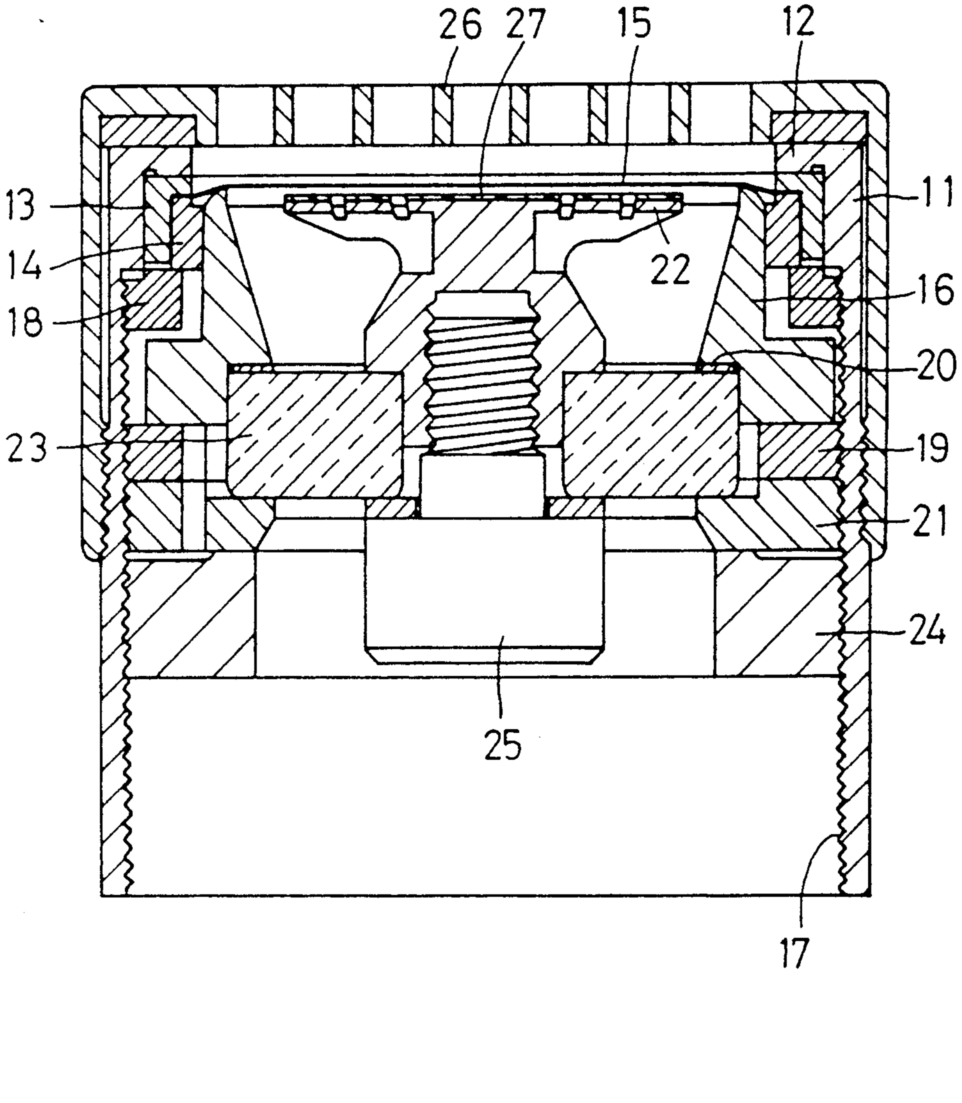
FIG. 1 PRIOR ART
FIG. 1 is sectional view showing, by way of example, a microphone.

A description will be given first, with reference to FIGS. 2A through 2D, of a first embodiment of the diaphragm manufacturing method according to the present invention. The diaphragm 15 made of a metal such as titanium, a titanium-alloy or nickel-alloy, about 1 to 6 $\mu$m thick, is mounted on a jig 31 and held thereto at its -peripheral portion. In this example the jig 31 is cylindrical in shape and has a flange 32 extending from the inner edge of its front open end and the -peripheral portion of the diaphragm 15 is clamped to the back of the flange 32 by means of a diaphragm clamping ring 33. The inner peripheral surface of the jig 31 has cut therein screw threads 34, with which a fixing ring 35 is threadably engaged, thereby urging the diaphragm clamping ring 33 against the flange 32. In this way, the diaphragm 15 is fixedly mounted on the jig 31.

Next, a presser 36 is screwed into the jig 31 to press a first ring 37 against the diaphragm 15, applying thereto tension. The presser 36 is cylindrical in shape and has on its front end face the first ring 37 disposed in position and at its rear end a threaded flange 38 formed integrally therewith, the threaded flange being threadably engaged with the screw threads 34. By turning the presser 36, the first ring 37 can be pressed forward. In this fashion, the first ring 37 is fed forward until the tension of the diaphragm 15 reaches a predetermined value.

Figure 2A:
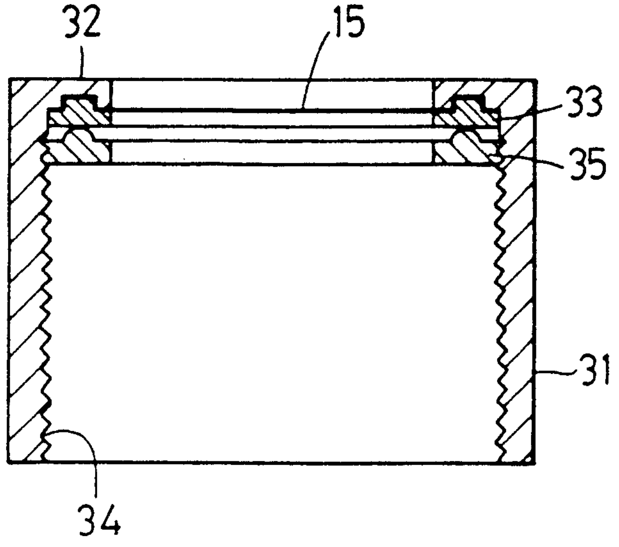
FIGS. 2A to 2D are sectional views, for explaining a sequence of steps in the manufacture of a first embodiment of the unit according to the present invention.
Figure 2B:
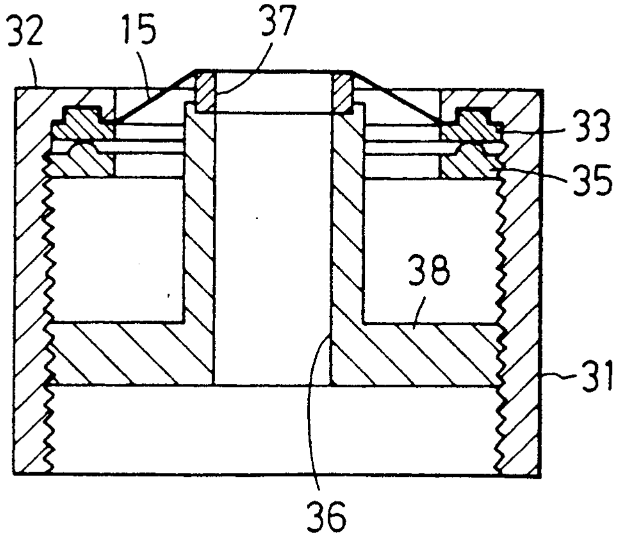
Figure 2C:
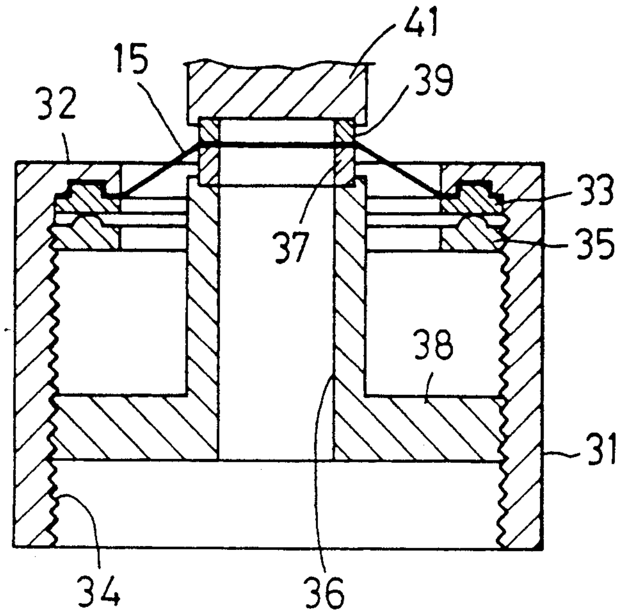

Next, a second ring 39 is disposed opposite the first ring 37 with the diaphragm 15 gripped therebetween as shown in FIG. 2C; namely, the diaphragm 15 is sandwiched between the first and second rings 37 and 39. The second ring 39 is pressed by a supplementary means 41 against the first ring 37.

Figure 2D:
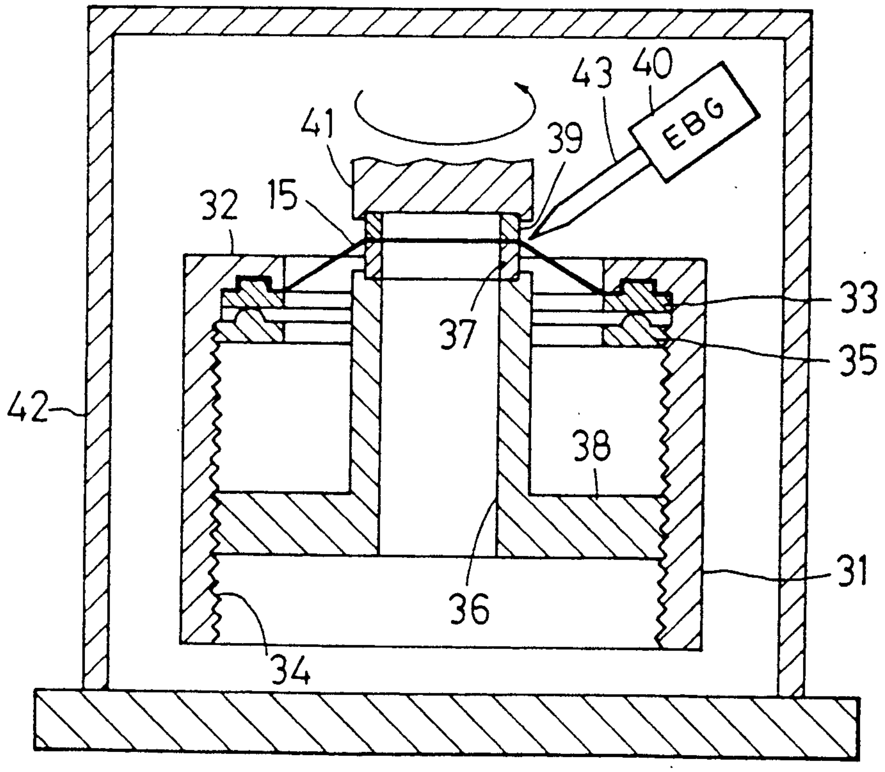

The structure thus assembled as shown in FIG. 2C is then placed in a vacuum chamber 42 as depicted in FIG. 2D. The vacuum chamber 42 is evacuated to a vacuum of around $1\times10^{-2}$ Torr, in which the boundary between the diaphragm 15 and the second ring 39 is irradiated with an electron beam (0.3 mm or less in spot diameter) from an electron beam gun (EBG) 40 and at the same time the entire structure including the jig 31, the supplementary means 41, etc. is turned about the center of the structure, thereby welding the diaphragm 15 to the first and second rings 37 and 39 over the entire circumference thereof. The time for irradiation with the electron beam at each point may be one second or so. To ensure good welding, it is desirable that the diaphragm 15 and the first and second rings 37 and 39 be made of the same material In such a manner as described above, the diaphragm 15 retaining substantially the same tension as that applied thereto before the welding is integrated with the first and second rings 37 and 39, providing the diaphragm unit. Since the diaphragm 15 gripped by the first and second rings 37 and 39 is held with predetermined tension by itself, there is no need of using such a conventional tension applying means as the cylindrical presser when the diaphragm unit is incorporated into the condenser microphone.

Figure 3:
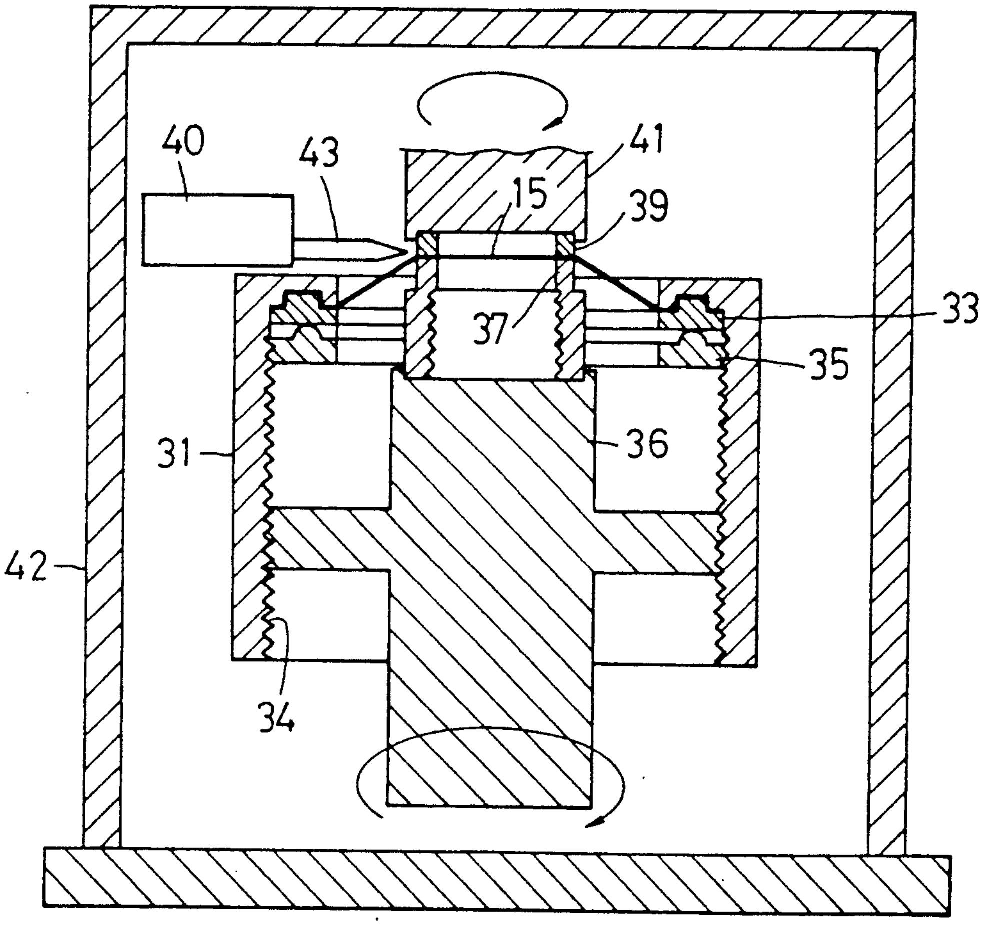
FIG. 3 is a sectional view of a second embodiment of the diaphram unit as it appears in the stage of manufacture corresponding to FIG. 2D.

FIG. 3 is a diagram, corresponding to FIG. 2D, which illustrates a second embodiment of the present invention in which the first ring 37 is used also as the microphone housing. That is, the first ring 37 is a cylindrical member in this example A description will be given later of an example of the condenser microphone which employs the first ring serving also as the microphone housing.

Figure 4A:
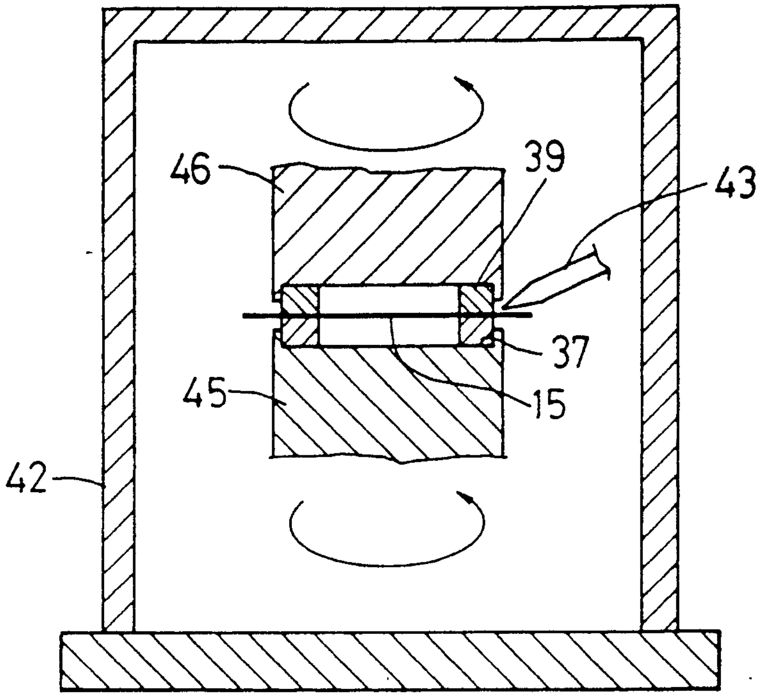
FIGS. 4A and 4B are sectional views, for explaining another method for the manufacture of the diaphram unit of the present invention.
Figure 4B:
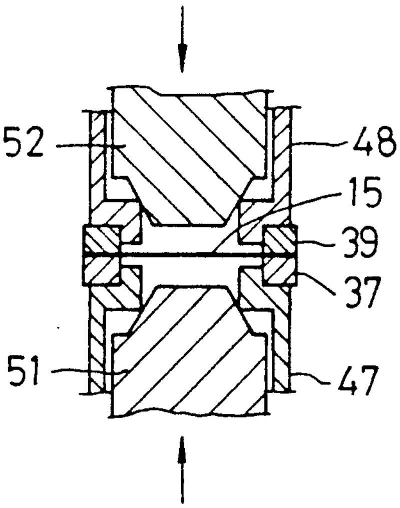

FIGS. 4A and 4B illustrate a third embodiment of the present invention. As depicted in FIG. 4A, the first ring 37 is mounted on a first fixture 45; the diaphragm 15 is disposed across the first ring 37; the second ring 39 is placed on the first ring 37 with the diaphragm 15 gripped therebetween; and a second fixture 46 is mounted on the second ring 39. In this fashion, the diaphragm 15 which is not yet given tension is held between the first and second rings 37 and 39.

Next, the structure thus assembled is placed in the vacuum chamber 42 evacuated to a vacuum of approximately $1\times10^{-2}$ Torr, and the point of contact between the diaphragm 15 and the first ring 37 or second ring 39 is irradiated with the electron beam 43 while at the same time the fixtures 45 and 46 are rotated together. Thus the diaphragm 15 is welded to the first and second rings 37 and 39.

After this, the first and second rings 37 and 39 are expanded in diameter to give predetermined tension to the diaphragm 15. This is carried out in a manner such, for example, as shown in FIG. 4B. Auxiliary jigs 47 and 48 are prepared which are each cylindrical in shape and has at one end a small-diametered portion The small-diametered portions of the auxiliary jigs 47 and 48 are fitted into the first and second rings 37 and 39, respectively, and expanding jigs 51 and 52, each having at one end a truncated conical portion, are pressed into the auxiliary jigs 47 and 48, respectively, with the peripheral surfaces of their truncated conical portions against inner edges of the auxiliary jigs 47 and 48 between their large- and small-diametered portions. By pressing the expanding jigs 51 and 52 toward each other, the diameters of the first and second rings 37 and 39 are expanded through the expanding jigs 51 and 52, applying tension to the diaphragm 15. In this instance, a titanium-base alloy of a $\beta$-type crystal structure is suitable for the diaphragm 15 and the first and second rings 37 and 39 because of its high expansibility.

In either case, the frequency band of the microphone can freely be chosen by a suitable selection of the tension which is applied to the diaphragm 15.

Figure 5:
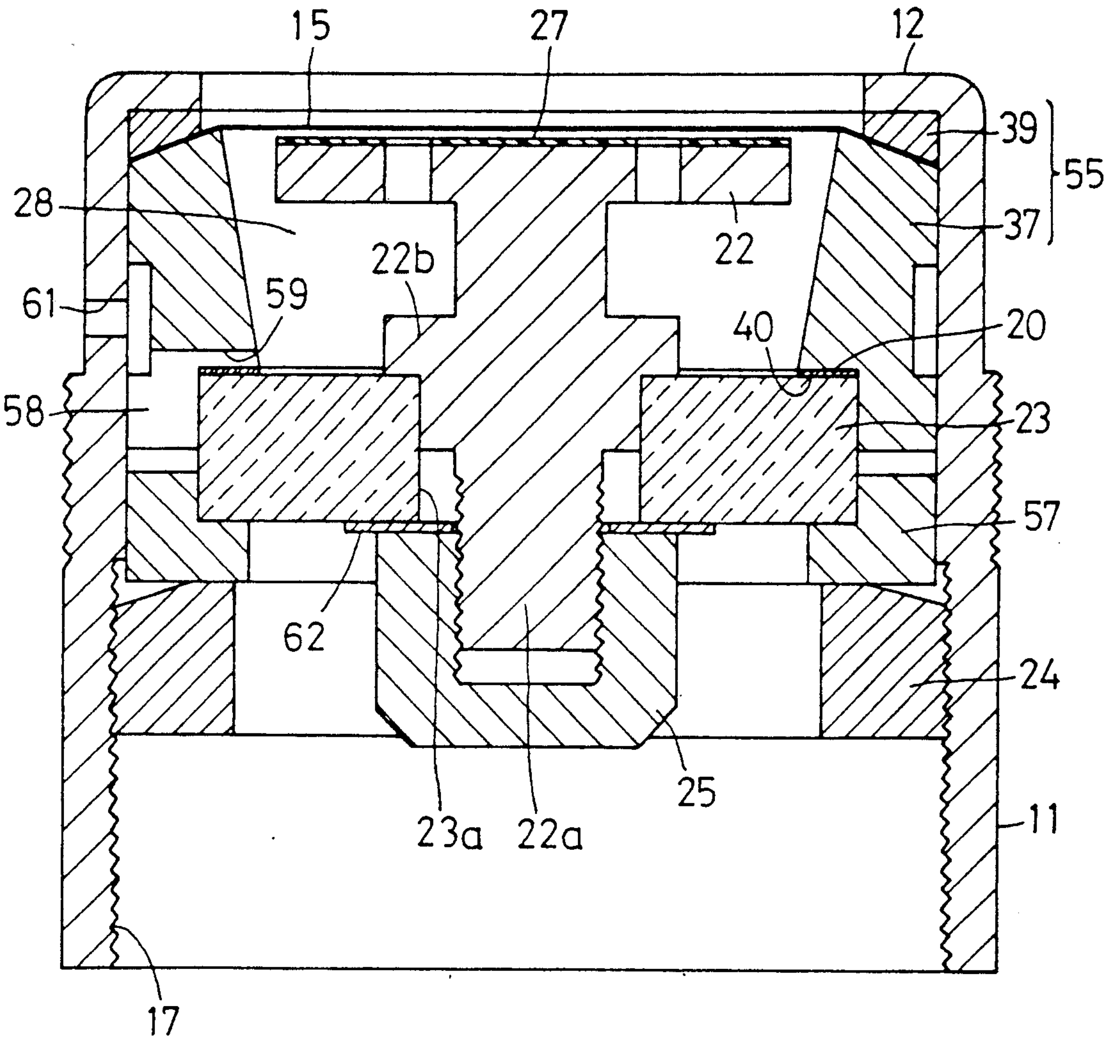
FIG. 5 is sectional view illustrating a condenser micro employing the diaphragm unit of the present invention.

FIG. 5 illustrates an example of a condenser microphone employing the diaphragm unit 55 obtained by the method described above in respect of FIGS. 2A to 2D or FIGS. 4A and 4B. In this example, the contact end faces of the first and second rings 37 and 39 are sloped and the inner diameter of the sloped end face of the first ring 37 is smaller than the inner diameter of the sloped end face of the second ring 39, and accordingly the first ring 37 protrudes inwardly of the second ring 39. Consequently, the peripheral portion of the diaphragm 15 is supported by the inner marginal edge of the sloped end face of the first ring 37. The first ring 37 has a stepped portion 40 formed in its inner peripheral surface at the backward portion thereof. The diaphragm unit 55, which has the diaphragm 15 clamped at its marginal portion between the first and second rings 37 and 39 and welded thereto through electron beam welding, is held against the back of the flange 12 of the housing 11. The back electrode 22 is disposed opposite the diaphragm 15, the back electrode 22 being deposited over the entire area of its front surface with the electret film 27. A flange 22*b* extending from a support rod 22*a* of the back electrode 22 is partly received in a centrally-disposed through hole 23*a* of the ring-shaped support plate 23 made of an insulating material, with the support rod 22*a* of the back electrode projecting out of the through hole on the back of the support plate 23. The rear end portion of the support rod 22*a* has screw threads and is screwed into a tapped hole of a terminal 25, and by the tightening of the threaded terminal 25 the back electrode 22 is fixedly secured to the support plate 23. The support plate 23 is urged and held against the stepped portion 40 in the inner peripheral surface of the first ring 37 with the spacer 20 held between them. An auxiliary ring 57 is held against the support plate 23 at its back and outer peripheral surface, and the ring-shaped screw 24 is urged against the back of the auxiliary ring 57. The ring-shaped screw 24 is threadably engaged with the screw threads 17 of the housing 11. The first ring 37 has a slit 58 extending axially from its rear end to form a channel 59 which extends to a space 28 behind the back electrode 22. The channel 59 communicates with the outside through an air hole 61 made in the housing 11. A washer 62 is interposed between the support plate 23 and the terminal 25.

Figure 6:
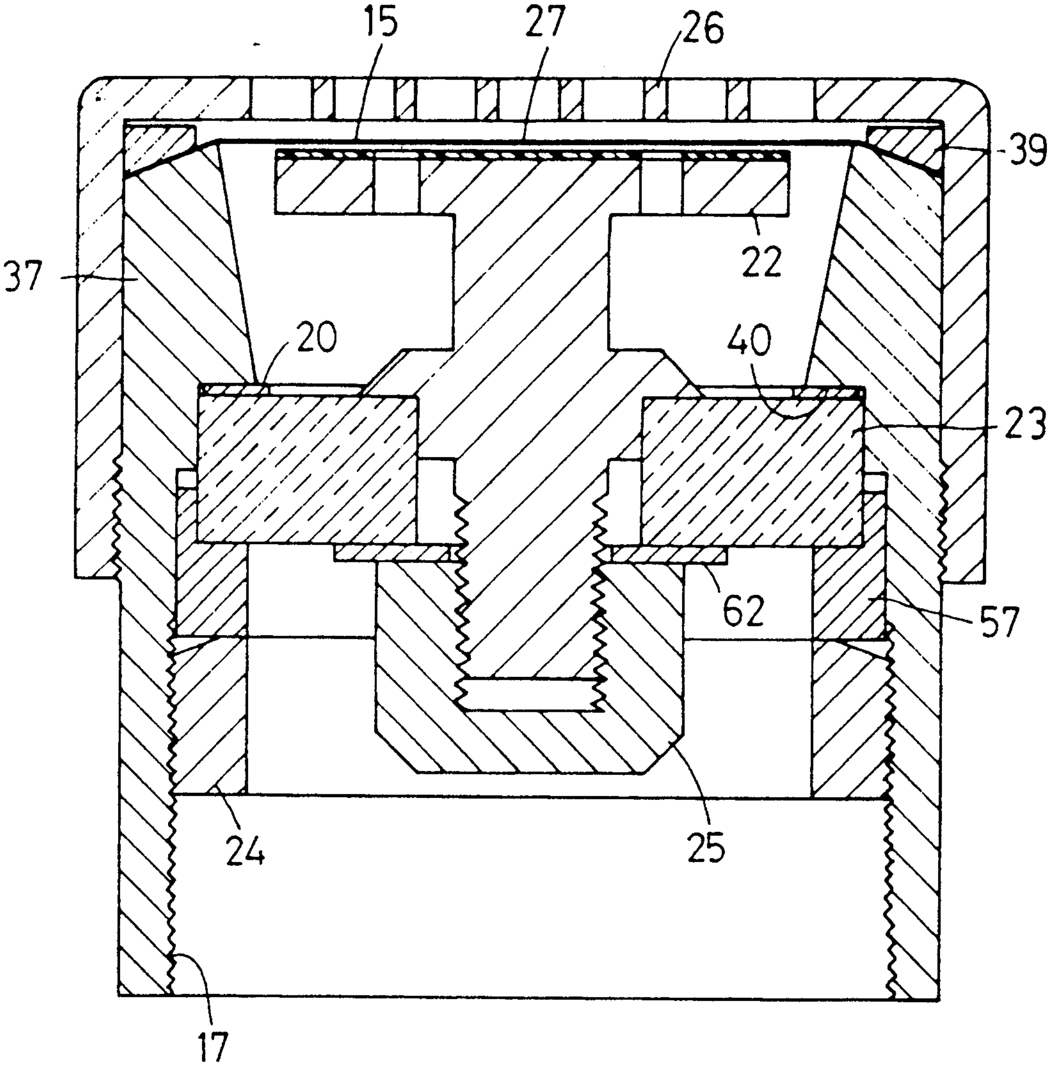
FIG. 6 is a sectional view illustrating another example of a condenser microphone utilizing the diaphragm unit of the present invention.

FIG. 6 illustrates an example of a condenser microphone which employs the diaphragm produced by the embodiment described previously with regard to FIG. 3, the parts corresponding to those in FIG. 5 being identified by the same reference numerals. The first ring 37 is cylindrical in shape and used to form the microphone housing, in which the back electrode 22 and the support plate 23 therefor are disposed and the auxiliary ring 57 is also housed. The inner peripheral surface of the first ring 37 has at its rear portion the screw threads 17, with which the ring-shape-d screw 24 is threadably engaged, holding the back electrode 22 in the first ring 37. The first ring 37 is capped with the grid 26 disposed opposite the diaphragm 15.

Figure 7:
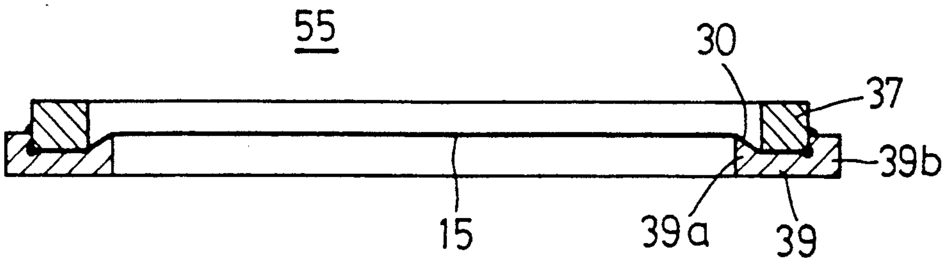
FIG. 7 is a sectional view illustrating another example of the diaphragm unit of the present invention.

FIG. 7 illustrates a fourth embodiment of the diaphragm unit of the present invention The diaphragm 15 is joined along its entire marginal portion to the first ring 37 on one side thereof. Where the diaphragm 15 is a metallic one, it is welding to the first ring 37 through electron beam welding, and where the diaphragm 15 is one that is produced by coating a polyester or similar synthetic resin film with a metallic layer, it is bonded to the first ring 37 by use of an adhesive The second ring 39 made of metal is welded by electron beam welding to the first ring 37 with the diaphragm 15 sandwiched therebetween The second ring 39 may preferably be made of the same material as that of the first ring 37. The second ring 39 has edge flanges 39*a* and 39*b* raised about its inner and outer peripheries along the inner and outer peripheries of the first ring 37, respectively. The inner and outer edge flanges 39*a* and 39*b* define therebetween a recess for receiving the first ring 37. The diaphragm 15 is urged by the inner edge flange 39*a* forwardly into the first ring 37 and held tight with predetermined tension. After this, the outer edge flange 39*b* of the second ring 39 is welded by electron beam welding to the outer peripheral surface of the first ring 37 over the entire circumference thereof.

Figure 8A:
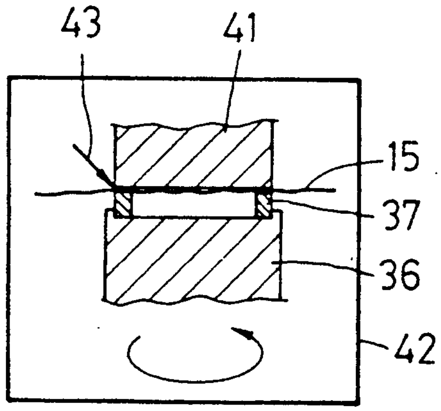
FIGS. 8A and 8B are sectional views, for explaining steps used in the production of the diaphragm unit depicted in FIG. 7.

The fabrication of such a diaphragm unit 55 starts with placing the first ring 37 on the jig 36 in the vacuum chamber 42 evacuated to a vacuum of about $10^{-2}$ Torr as shown in FIG. 8A, for example. The metallic diaphragm 15, free from tension, is placed substantially flat on one side of the first ring 37 and the fixture 41 is pressed against the first ring 37 from above. Then the metallic diaphragm 15 is welded to the first ring 37 over the entire circumference thereof by applying the electron beam 43 obliquely aslant to them.

Figure 8B:
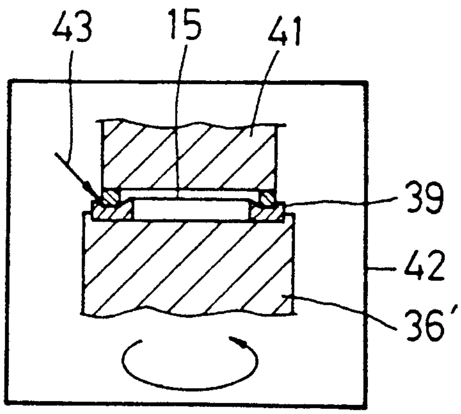

Next, as shown in FIG. 8B, in the vacuum chamber 42 the second ring 39 is mounted on a jig 36', the first ring 37 having spread thereon the metallic diaphragm 15 is disposed on the second ring 39 with the diaphragm 15 upside down, and the first ring 37 is urged against the second ring 39 from above by the jig 41 so that the inner edge flange 39*a* of the second ring 39 protrudes into the first ring 37, applying predetermined tension to the diaphragm 15. Then the electron beam 43 is applied diagonally to the contact portion between the first and second rings 37 and 39 to weld them over the entire circumference thereof. Thus the diaphragm 15 spread with predetermined tension. Incidentally, the first and second rings 37 and 39 may also be exchanged with each other.

Figure 9:
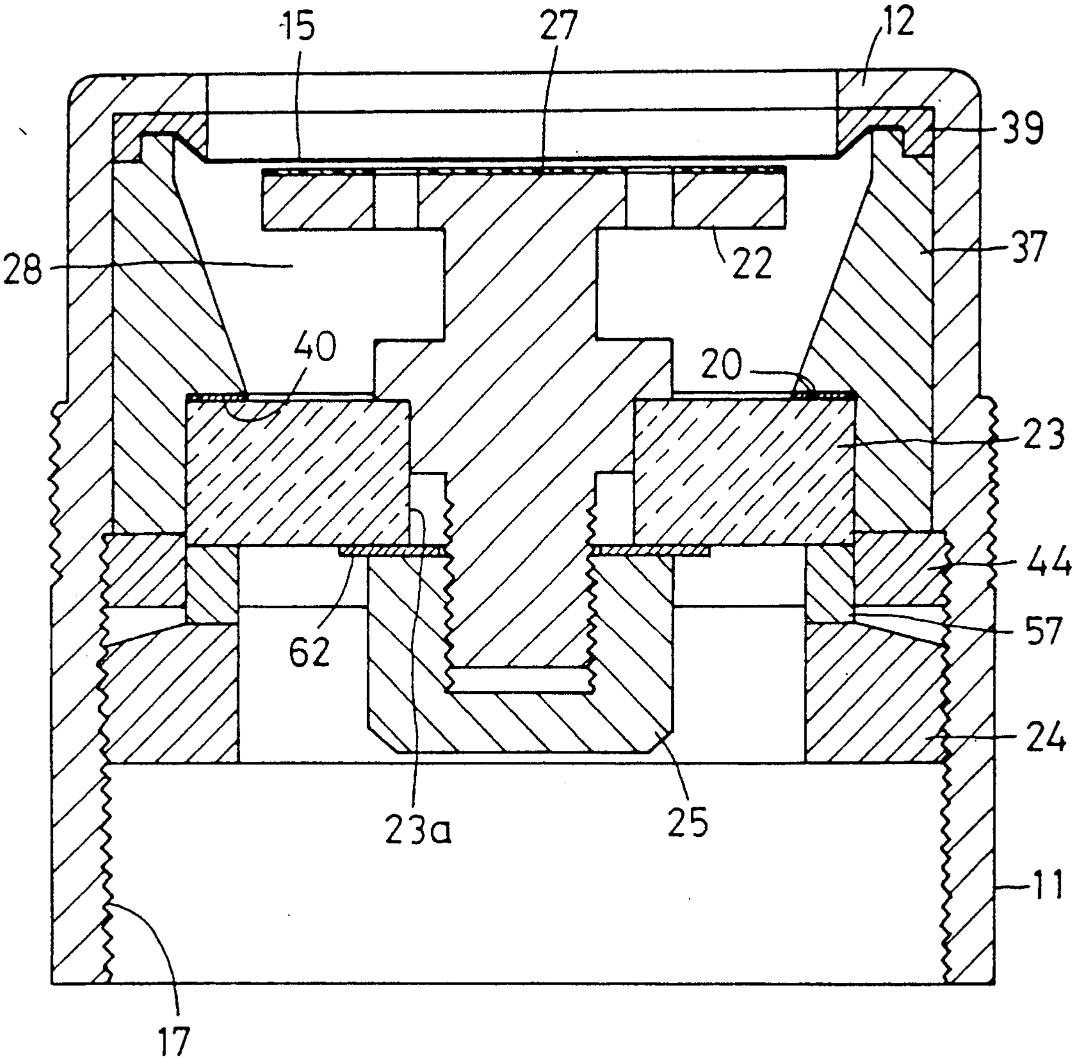
FIG. 9 is a sectional view illustrating an example of a condenser microphone with the diaphragm unit of FIG. 7 built therein.

FIG. 9 illustrates an example of a microphone which employs the diaphragm unit 55 which is a modified form of the embodiment shown in FIGS. 7, 8A and 8B. The housing 11 has the flange 12 extending inwardly from its front marginal edge, and the diaphragm unit 55 is housed in the housing 11, with the second ring 39 held against the flange 12. The first ring 37 is fixed to the housing 11 by a ring-shaped screw 44 threadably engaged with the screw threads 17 of the housing 11. The back electrode 22 is disposed opposite the diaphragm 15, the back electrode 22 being coated with the electret film 27 on the side facing the diaphragm 15. The support plate 23 is received in the stepped portion made in the interior surface of the first ring 37, with the spacer 20 held between them, and the back electrode 22 is supported by the support plate 23. The support plate 23 is fixedly held by the ring-shaped screw 24 through the auxiliary ring 57. The ring-shaped screw 24 is threadably engaged with the screw threads 17. The terminal 25 is thread-mounted on the rear of the back electrode 22 with the washer 62 held against the support plate 23.

Figure 10:
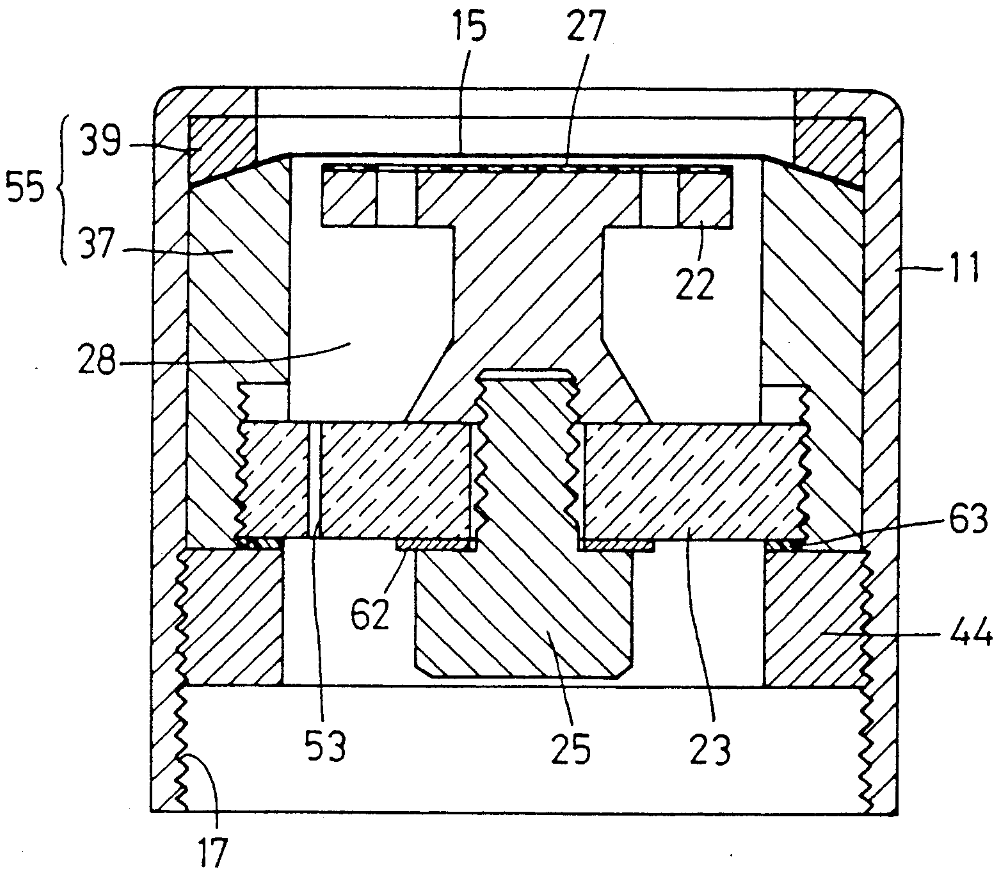
FIG. 10 is a sectional view illustrating an example of a condenser microphone in which the support plate 23 for supporting the back electrode is made of machinable crystalline glass.

FIG. 10 illustrates another embodiment of the condenser microphone of the present invention, in which the parts corresponding to those in FIG. 9 are identified by the same reference numerals. In this embodiment, the support plate 23 of an insulating material for supporting the back electrode 22 is made of machinable crystalline glass and the support plate 23 has screw threads cut in its outer peripheral surface over the entire circumference thereof. The support plate 23 has an air hole 53 which is made therethrough by a laser beam, as required. Further, the support plate 23 has a centrally-disposed through hole, through which the terminal 25 is screwed into the back electrode 22. The diaphragm unit 55 mounted in the housing 11 has a structure in which the diaphragm 15 is given predetermined tension, has its peripheral portion gripped between the first and second rings 37 and 39 and is welded thereto over the entire circumference thereof by such a method as described previously in connection with FIGS. 2A and 2B or FIG. 3. The inner peripheral surface of the first ring 37 has cut therein screw threads, with which the support plate 23 is threadably engaged. The depth into which the support plate 23 is screwed is determined by a predetermined electrostatic capacitance between the diaphragm 15 and the back electrode 22. A ring-shaped screw 44 is threadably engaged with the screw threads 17 of the housing 11 at the back of the first ring 37, by which the first ring 37 is fixedly held against the housing 11 and the support plate 23 is urged and fixed through a bushing 63 is made of an elastic resin.

The machinable crystalline glass herein mentioned is one that s now on sale, for example, under the trademark "MACOR" by Corning Glass Inc. of the United States; this is an isotropic compound material composed of glass and ceramic, which is produced by melting raw materials, molding the melt into a desired shape such as a sheet, bar or rod, and heat treating the molding so that crystallites of synthetic mica are grown randomly in glass. This machinable crystalline glass has a coefficient of thermal expansion of $9.4\times10^{-6}/°C.$ which is relatively close to that of a titanium alloy, a high volume resistivity of $10^{16}$ Ωcm or more, excellent in insulating property, and a coefficient of water absorption of zero, excellent in water resisting property; besides, this glass is machinable and can be cut into complex shapes, including screw cutting.

Heretofore, optical glass has been employed for the support plates 23 for fixing the back electrode 22 because it has a coefficient of thermal expansion substantially equal to that of the material (titanium or a titanium alloy) for the back electrode 22, a high volume resistivity, a high breakdown voltage and zero coefficient of water absorption. However, the optical glass is difficult of machining such as screw cutting and drilling of thin holes, and is costly. According to the present invention, since the machinable crystalline glass is used for the support plate 23 for supporting the back electrode 22, screw threads can be cut in the outer periphery of the support plate for threaded engagement with the inner peripheral surface of the first ring 37 as shown in FIG. 10; so that the gap between the diaphragm 15 and the back electrode 22 can easily be adjusted simply by turning the support plate 23. This precludes the necessity of high precision setting of the heights of the back electrode 22 and the first ring, that is, avoids necessity of their precision cutting, makes the spacer 20 unnecessary and allows in ease in mounting the support plate 23 into the housing 11, thus affording the reduction of manufacturing costs of the microphone. Moreover, since the support plate 23 can easily be machined, the air hole 53 as thin as 0.2 mm, for example, can be made in the support plate 23 by a laser beam. The use of the machinable crystalline glass enables the air hole 53 of a desired size to be made in the support plate 23 at a desired position and thus allows a wide freedom of design.

As described above, according to the present invention, since the diaphragm is held taut between an welded or bonded to the first and second rings, the microphone does not require any presser for applying tension to the diaphragm and is small in the number of parts therefor, easy of assembling, small in size and low-cost accordingly. Where the first ring is used also as the microphone housing, the number of parts used is further reduced, permitting further miniaturization of the microphone and further reduction of its manufacturing costs.

Since the diaphragm is gripped between the first and second rings and welded thereto by electron beam welding, the tension of the diaphragm is not easily reduced and is held at a predetermined value. In the embodiments shown in FIGS. 5, 6, 9 and 10, titanium or a titanium alloy can be used for the diaphragm unit 55 and stainless steel for the housing 11; namely, materials of different coefficients of thermal expansion but suited to respective parts can be utilized.

Furthermore, according to the present invention, since the diaphragm is held by the first and second rings alone and given tension by them, the tension of the diaphragm is free from the influence of thermal expansion of the housing 11, the auxiliary ring 57, etc. even if temperature varies. Accordingly, the housing 11, the auxiliary ring 57, etc. and the first and second rings need not be made of the same material, and this also affords the reduction of the manufacturing costs of the condenser microphone.

We claim:

1. A method of making of diaphragm unit for a condenser microphone, comprising the steps of:

(a) holding a peripheral portion of a metallic diaphragm on a jig;

(b) pressing a metallic first ring, by pressing means engaged with the jig, against the diaphragm to apply thereto predetermined tension;

(c) gripping the diaphragm between the first ring and a metallic second ring of the same material las the first ring;

(d) pressing the second ring against the first ring via the diaphragm; and (e) applying an electron beam to the outer circumference of an abutment between adjoining portions of the first and second rings to weld the first and second rings together with the diaphragm.

2. The method of making a diaphragm unit for a condenser microphone according to claim 1, wherein the first ring forms a housing of the condenser microphone.

* * * * *